(12) United States Patent
Kim et al.

(10) Patent No.: US 9,698,429 B2
(45) Date of Patent: Jul. 4, 2017

(54) FUEL CELL AND METHOD OF MANUFACTURING SAME

(71) Applicant: LG CHEM, LTD., Seoul (KR)

(72) Inventors: Kwanghyun Kim, Daejeon (KR); Gyo Hyun Hwang, Daejeon (KR); Sang Hoon Kim, Daejeon (KR); Jun Yeon Cho, Daejeon (KR)

(73) Assignee: LG CHEM, LTD., Seoul (KR)

( * ) Notice: Subject to any disclaimer, the term of this patent is extended or adjusted under 35 U.S.C. 154(b) by 0 days.

(21) Appl. No.: 14/904,305

(22) PCT Filed: Oct. 31, 2014

(86) PCT No.: PCT/KR2014/010394
§ 371 (c)(1),
(2) Date: Jan. 11, 2016

(87) PCT Pub. No.: WO2015/065123
PCT Pub. Date: May 7, 2015

(65) Prior Publication Data
US 2016/0156043 A1     Jun. 2, 2016

(30) Foreign Application Priority Data

Nov. 1, 2013   (KR) .................. 10-2013-0132413

(51) Int. Cl.
*H01M 4/92*   (2006.01)
*H01M 4/88*   (2006.01)
(Continued)

(52) U.S. Cl.
CPC ......... *H01M 4/926* (2013.01); *H01M 4/8652* (2013.01); *H01M 4/881* (2013.01); *H01M 4/9041* (2013.01); *H01M 4/9075* (2013.01); *H01M 4/921* (2013.01); *H01M 4/925* (2013.01); *H01M 8/1004* (2013.01); *H01M 8/1016* (2013.01)

(58) Field of Classification Search
CPC .. H01M 4/881; H01M 4/9075; H01M 8/1004; H01M 4/9041; H01M 4/926
See application file for complete search history.

(56) References Cited

U.S. PATENT DOCUMENTS

2005/0075240 A1   4/2005   Yamamoto
2009/0035208 A1   2/2009   Axmann et al.
(Continued)

FOREIGN PATENT DOCUMENTS

JP   2006-045582 A   2/2006
JP   2006-228450 A   8/2006
(Continued)

OTHER PUBLICATIONS

Lanhua Yi et al., "Carbon supported Pt hollow nanospheres as anode catalysts for direct borohydride-hydrogen peroxide fuel cells", International Journal of Hydrogen Energy 36, 2011, pp. 11512-11518.
(Continued)

*Primary Examiner* — Mark F Huff
*Assistant Examiner* — Monique Wills
(74) *Attorney, Agent, or Firm* — Dentons US LLP

(57) ABSTRACT

The present application relates to a fuel cell and a method of manufacturing the same.

20 Claims, 10 Drawing Sheets

(51) Int. Cl.
H01M 4/90 (2006.01)
H01M 4/86 (2006.01)
H01M 8/1004 (2016.01)
H01M 8/1016 (2016.01)

(56) References Cited

U.S. PATENT DOCUMENTS

| | | | | |
|---|---|---|---|---|
| 2010/0316930 | A1* | 12/2010 | Shao | H01M 4/921 |
| | | | | 429/482 |
| 2013/0149632 | A1 | 6/2013 | Yoo et al. | |
| 2013/0344421 | A1* | 12/2013 | Montaut | H01M 4/926 |
| | | | | 429/524 |
| 2016/0028091 | A1* | 1/2016 | Hwang | H01M 4/886 |
| | | | | 427/446 |

FOREIGN PATENT DOCUMENTS

| | | |
|---|---|---|
| JP | 2009-500158 A | 1/2009 |
| JP | 2010-214330 A | 9/2010 |
| JP | 2011-181359 A | 9/2011 |
| KR | 10-2008-0073812 A | 8/2008 |
| KR | 10-2010-0068029 A | 6/2010 |
| KR | 10-2013-0071856 A | 7/2013 |
| WO | 2013101595 A1 | 7/2013 |

OTHER PUBLICATIONS

Yaojuan Hu et al., "Synthesis of graphene-supported hollow Pt-Ni nanocatalysts for highly active electrocatalysis toward the methanol oxidation reaction", Electrochimica Acta 85, 2012, pp. 314-321.

I. Alonso-Lemus et al., "Platinum Nanoparticles Synthesis Supported in Mesoporous Silica and Its Effect in MCM-41 Lattice", Int. J. Electrochem. Sci., 6, 2011, pp. 4176-4187.

Shaojun Guo et al.: "High-Efficiency and Low-Cost Hybrid Nanomaterial as Enhancing Electrocatalyst: Spongelike Au/Pt Core/Shell Nanomaterial with Hollow Cavity", J. Phys. Chem. C, 2007, 111, pp. 17104-17109.

* cited by examiner

[Figure 1]
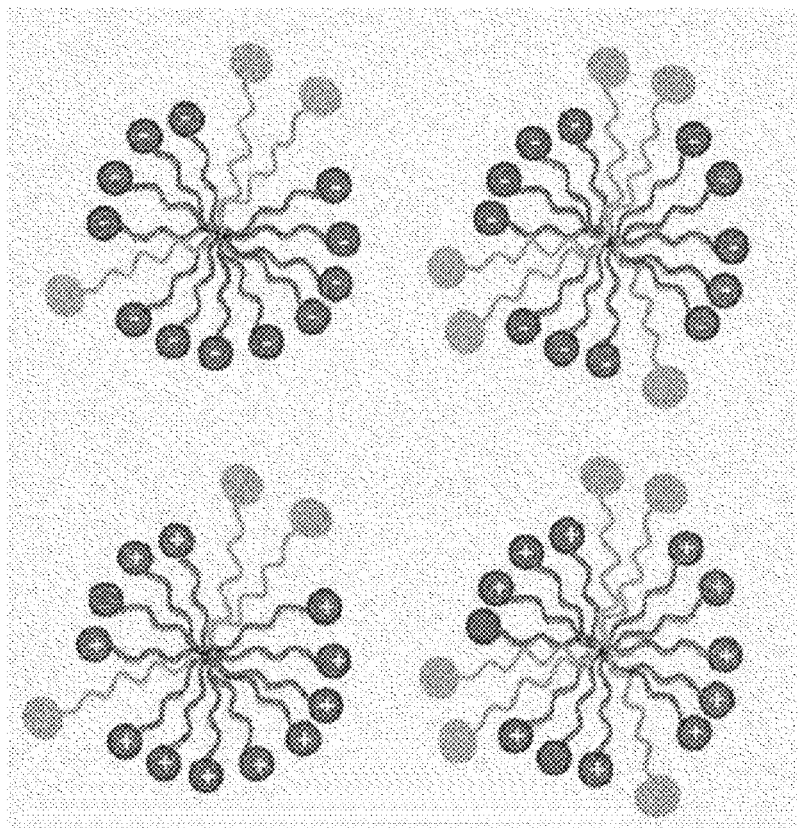

[Figure 2]
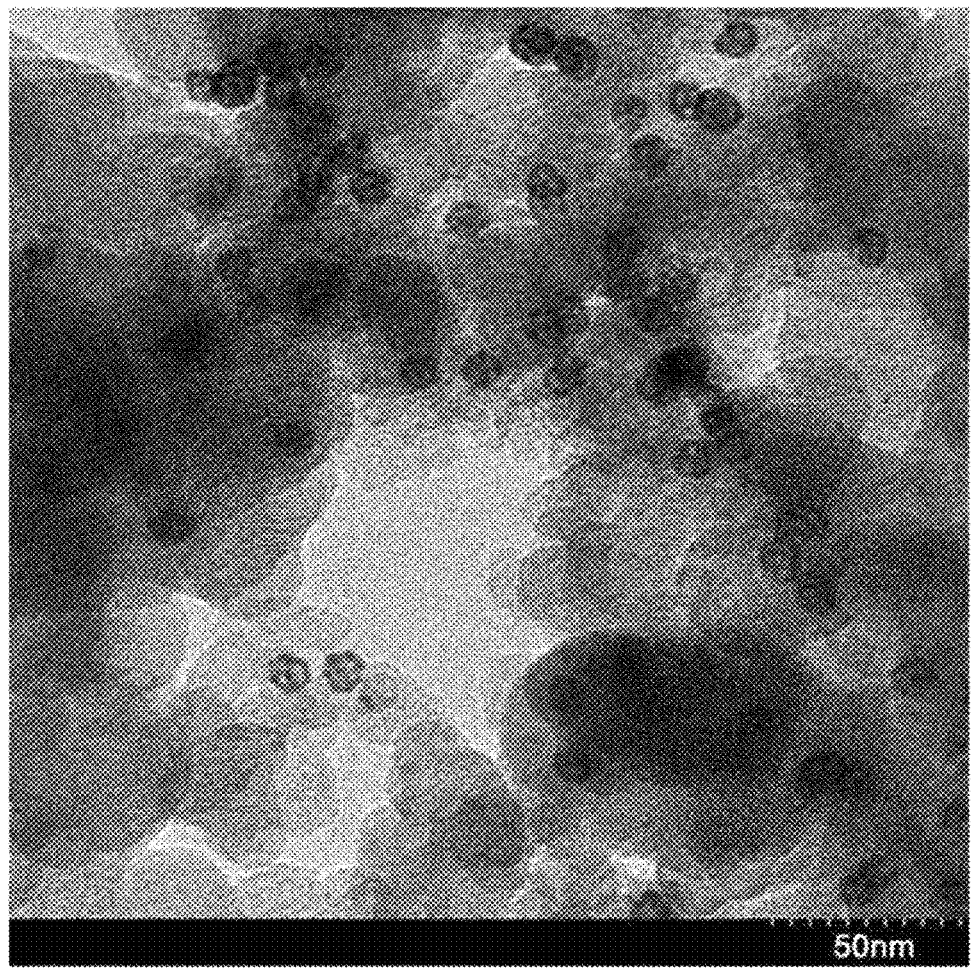

[Figure 3]
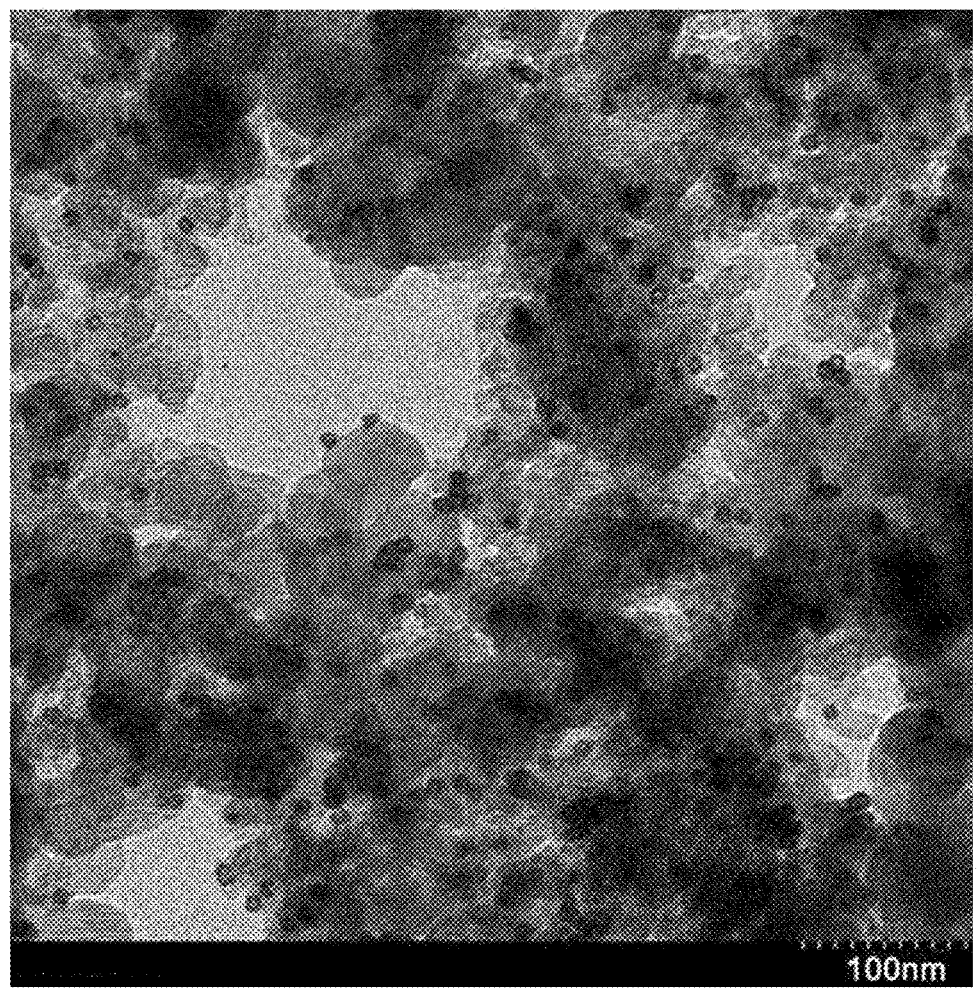

[Figure 4]
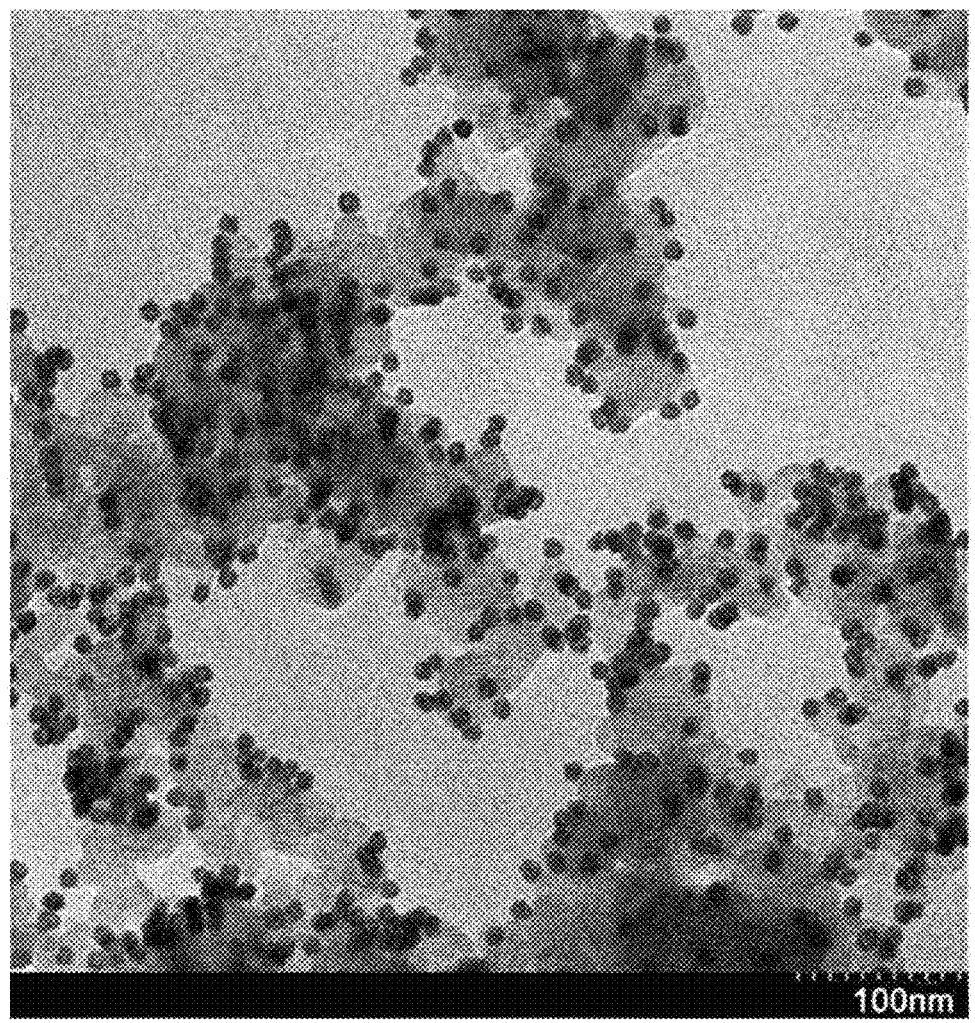

[Figure 5]
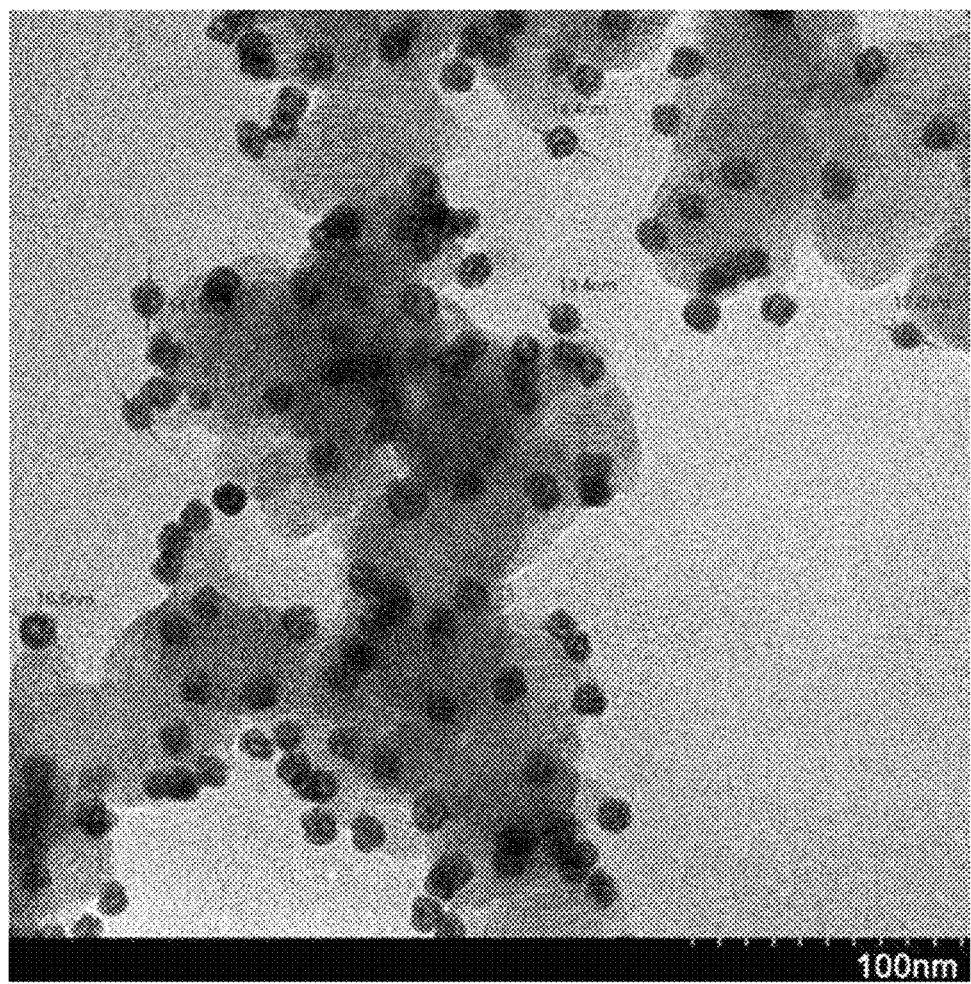

[Figure 6]
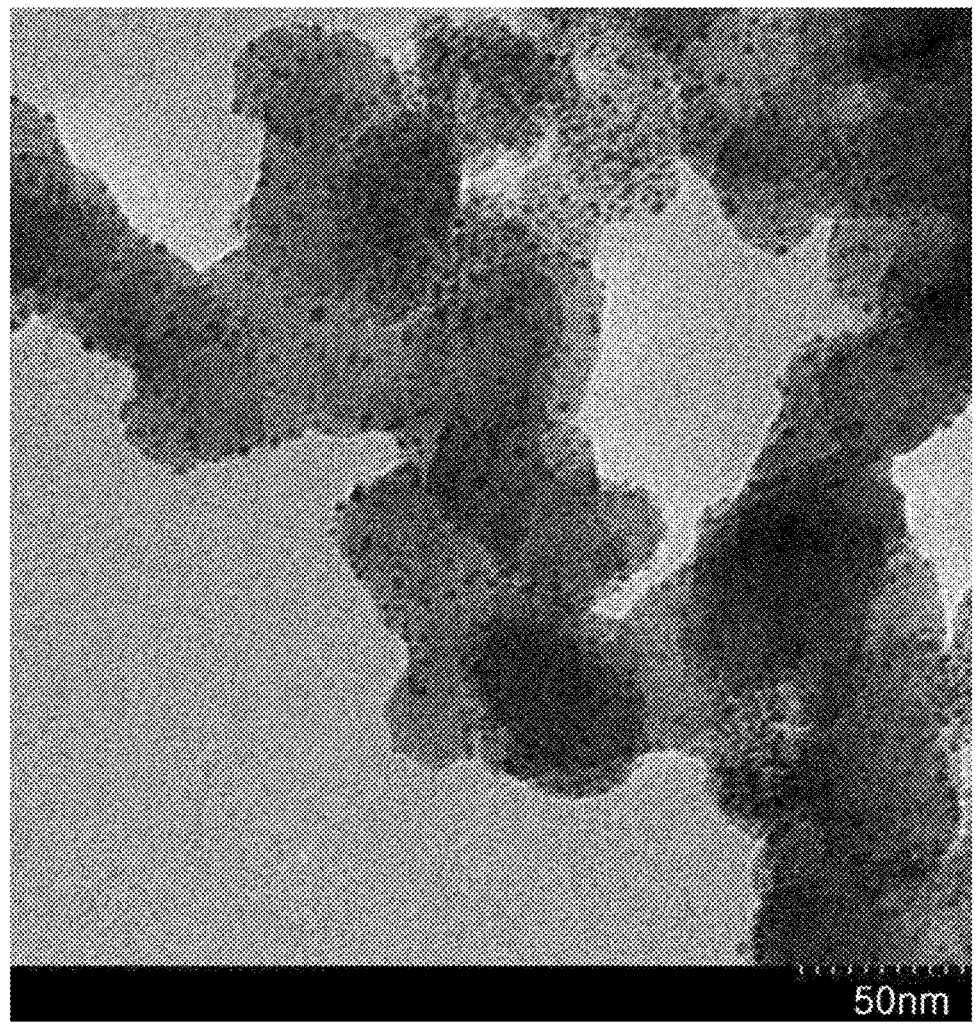

[Figure 7]
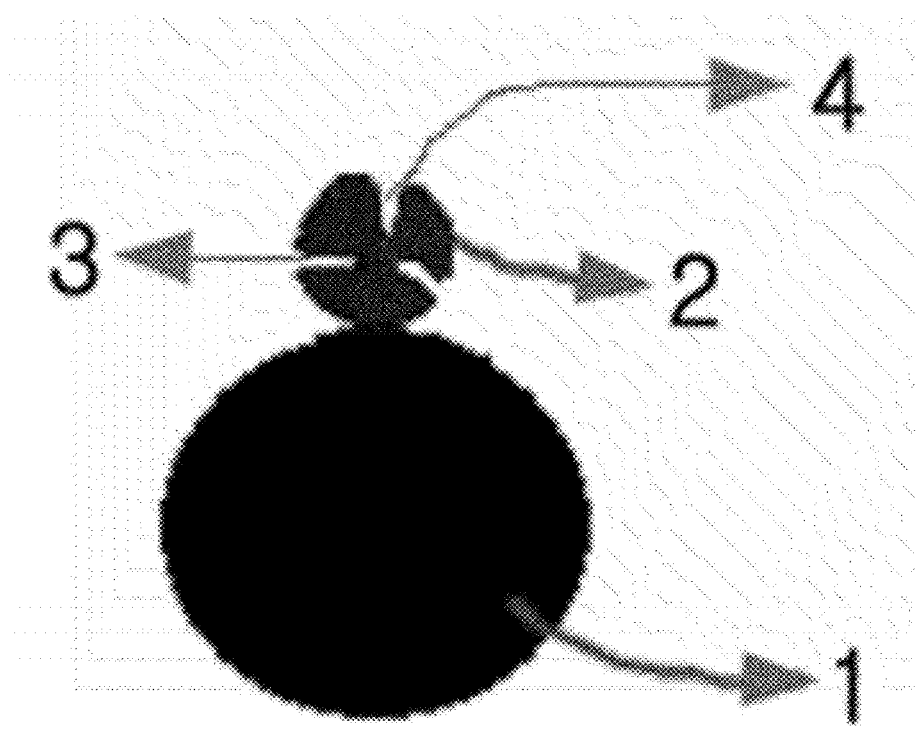

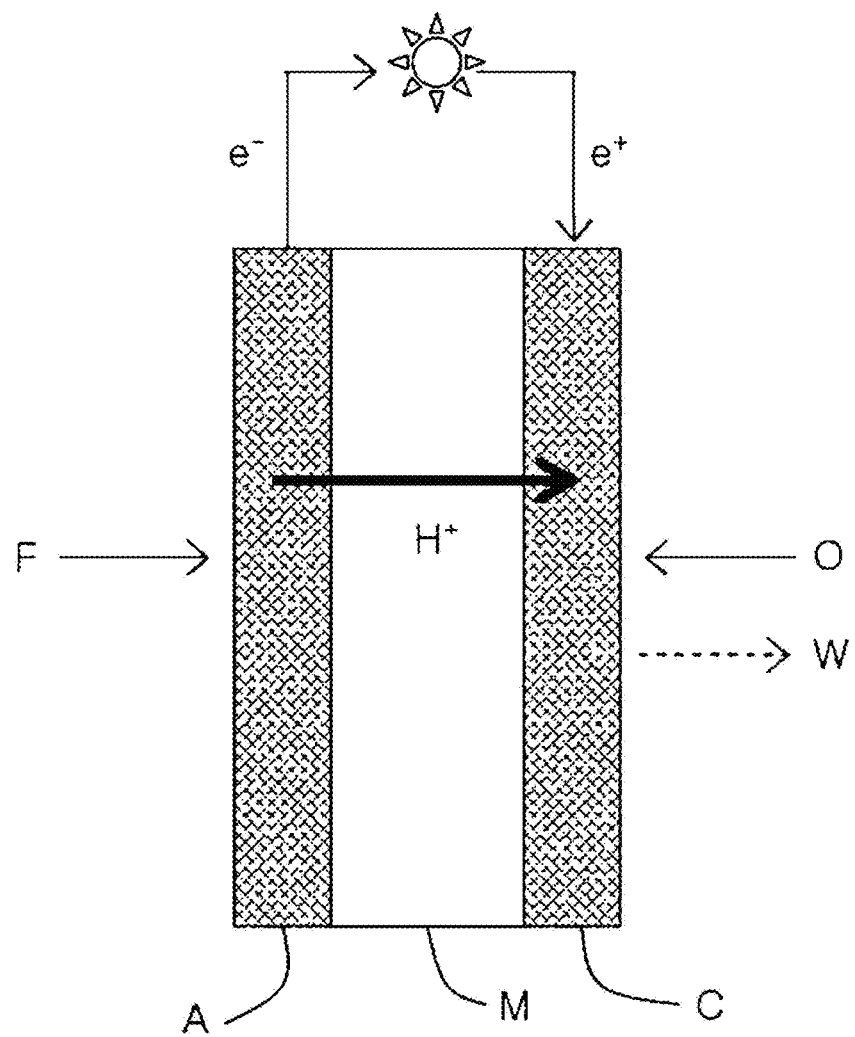
[Figure 8]

[Figure 9]
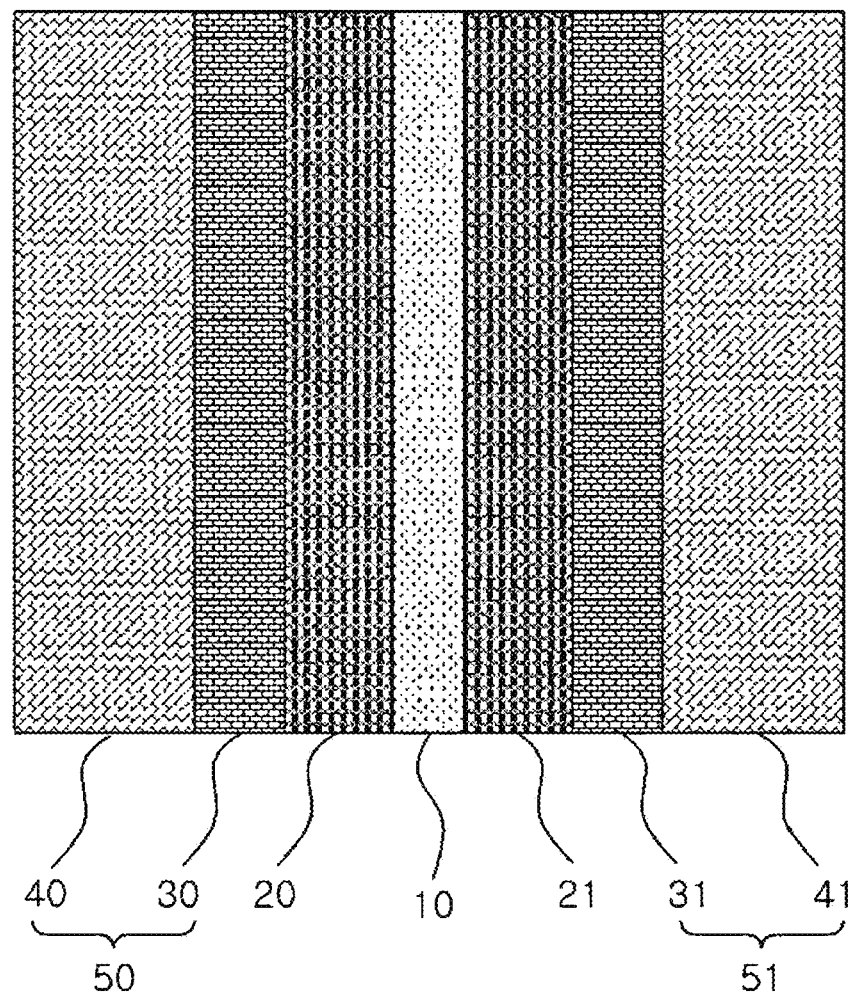

[Figure 10]
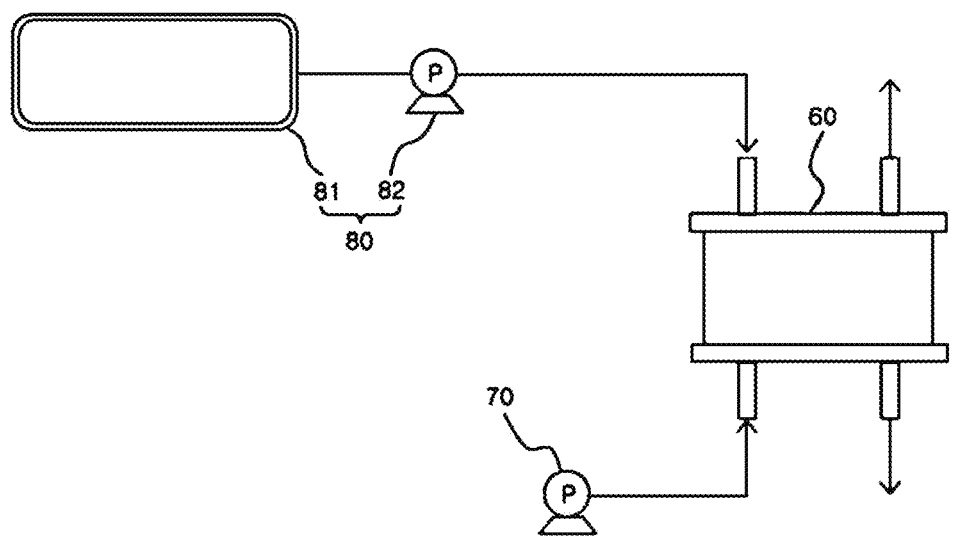

FUEL CELL AND METHOD OF MANUFACTURING SAME

TECHNICAL FIELD

This application is a National Stage Entry of International Application No. PCT/KR2014/010394, filed Oct. 31, 2014, and claims the benefit of and priority to Korean Patent Application No. 10-2013-0132413, filed in the Korean Intellectual Property Office on Nov. 1, 2013, both of which are incorporated herein by reference in their entirety for all purposes as if fully set forth herein.

The present application relates to a fuel cell and a method of manufacturing the same.

BACKGROUND ART

Recently, energy resources in the related art such as petroleum or coal have been expected to be exhausted, and thus an interest in energy that can replace the energy resources in the related art has been increased. A fuel cell as one of these alternative energy resources particularly receives attention due to merits in that the fuel cell has high efficiency, a pollutant such as $NO_x$ and $SO_x$ is not discharged, and used fuel is plentiful.

The fuel cell is an apparatus electrochemically reacting fuel and an oxidizing agent to generate electric energy. In the fuel cell, hydrogen is used as fuel, oxygen is used as the oxidizing agent, and an electrode is formed of an anode performing a catalyst role in a hydrogen oxidation reaction (HOR) and a cathode performing a catalyst role in an oxygen reduction reaction (ORR). In the fuel cell, the electrode includes a catalyst performing the aforementioned catalyst role, and platinum is generally used as a catalyst material. However, since platinum has problems in that cost is high and an allowance value with respect to an impurity is low, a lot of research has been conducted to manufacture and use a catalyst providing electrochemical activity and stability that are superior to those of pure platinum while reducing a use amount of platinum. In the aforementioned research, a plan for increasing activity of platinum itself or an electrode catalyst of an alloy type of platinum and a transition metal is mostly proposed, but recently, an interest in a nanoparticle structure type having electrochemical activity and stability has been increased.

Examples of a method of synthesizing metal nanoparticles include a method of reducing metal ions on a solution by a reducing agent, a method using a gamma ray, an electrochemical method, and the like, but in the methods in the related art, since it is difficult to synthesize nanoparticles having a uniform size and shape or an organic solvent is used, and thus it is difficult to perform mass production of high quality nanoparticles economically due to various reasons, for example, a reason where environmental pollution, high costs, and the like are considered as a problem.

Further, since the metal nanoparticles become easily unstable by a heat treatment temperature or a reaction temperature, there are many cases where the metal nanoparticles are dispersed in a carrier to be used. Therefore, there is a demand for development of a method of effectively carrying high quality metal nanoparticles having a uniform size in a carrier.

DETAILED DESCRIPTION OF THE INVENTION

Technical Problem

The problems to be solved by the present application are to provide a fuel cell including a carrier-metal nanoparticle complex where metal particles having a uniform nanosize are carried in a carrier as an electrode catalyst, and a method of manufacturing the same.

The problems to be solved by the present application are not limited to the aforementioned technical problems, and other unmentioned technical problems may be clearly understood by a person with skill in the art from the following description.

Technical Solution

An exemplary embodiment of the present application provides a fuel cell including: a cathode; an anode; and an electrolyte membrane provided between the cathode and the anode, in which at least one of the cathode and the anode includes a carrier-metal nanoparticle complex where a metal nanoparticle including a first metal and a second metal, and one or more cavities continuing from an external surface is carried in a carrier.

Another exemplary embodiment of the present application provides a method of manufacturing a fuel cell, including: preparing an electrolyte membrane; forming a cathode on one surface of the electrolyte membrane; and forming an anode on the other surface of the electrolyte membrane, in which at least one of the cathode and the anode includes a carrier-metal nanoparticle complex where a metal nanoparticle including a first metal and a second metal, and one or more cavities continuing from an external surface is carried in a carrier.

Advantageous Effects

In a fuel cell of the present application, at least one electrode includes a carrier-metal nanoparticle complex, and the carrier-metal nanoparticle is a complex where metal nanoparticles having a uniform size of several nanometers are carried in a carrier, and has excellent dispersivity and carrying ratio to the carrier, and thus may exhibit an excellent catalyst effect.

Further, there is a merit in that the metal nanoparticle carried in the carrier includes a cavity and even an internal surface area of the metal nanoparticle may be utilized as a contact area where a reaction occurs through the cavity, and thus catalyst efficiency is significantly increased.

BRIEF DESCRIPTION OF DRAWINGS

FIG. 1 schematically illustrates a figure of forming a micelle by a surfactant in a process of manufacturing a carrier-metal nanoparticle complex according to one exemplary embodiment of the present application.

FIGS. 2 and 3 illustrate a transmission electron microscope (TEM) image of a carrier-metal nanoparticle complex manufactured by Preparation Example 1.

FIGS. 4 and 5 illustrate a transmission electron microscope (TEM) image of a carrier-metal nanoparticle complex manufactured by Preparation Example 2.

FIG. 6 illustrates a transmission electron microscope (TEM) image of a carrier-metal nanoparticle complex in the related art.

FIG. 7 schematically illustrates a structure of the carrier-metal nanoparticle complex according to one exemplary embodiment of the present application.

FIG. 8 schematically illustrates a generation principle of electricity of a fuel cell.

FIG. 9 schematically illustrates a structure of a membrane electrode assembly for a fuel cell according to one exemplary embodiment of the present application.

FIG. 10 schematically illustrates a fuel cell according to one exemplary embodiment of the present application.

BEST MODE

Advantages and characteristics of the present application, and methods for achieving them will be apparent by referring to embodiments described below in detail in addition to the accompanying drawings. However, the present application is not limited to the exemplary embodiments to be disclosed below but may be implemented in various different forms. Therefore, the exemplary embodiments introduced herein are provided to make disclosed contents of the present application thorough and complete and sufficiently transfer the spirit of the present invention to those skilled in the art, and the present application is just defined by the scope of the appended claims. The sizes and the relative sizes of constituent elements shown in the drawings may be exaggerated for clarity of description.

Unless otherwise defined, all terms used herein, including technical or scientific terms, have the same meanings as those commonly understood by those skilled in the art to which the present application belongs. Further, such terms as those defined in a generally used dictionary are not to be interpreted to have idealized or excessively formal meanings unless clearly defined in the present application.

Hereinafter, the present application will be described in detail.

The present application provides a fuel cell including: a cathode; an anode; and an electrolyte membrane provided between the cathode and the anode, in which at least one of the cathode and the anode includes a carrier-metal nanoparticle complex where a metal nanoparticle including a first metal and a second metal, and one or more cavities continuing from an external surface is carried in a carrier.

Further, the present application provides a carrier-metal nanoparticle complex where a metal nanoparticle including a first metal and a second metal, and one or more cavities continuing from an external surface is carried in a carrier.

The fuel cell according to an exemplary embodiment of the present application is a type where a catalyst layer of the anode and a catalyst layer of the cathode come into contact with the electrolyte membrane, and may be manufactured according to a general method known in the art. For example, the fuel cell may be manufactured by thermal compression at 100 to 400° C. in a state where the cathode; the anode; and the electrolyte membrane positioned between the cathode and the anode are in close contact with each other.

The anode may include an anode catalyst layer and an anode gas diffusion layer. The anode gas diffusion layer may include again an anode fine pore layer and an anode base material.

The cathode may include a cathode catalyst layer and a cathode gas diffusion layer. The cathode gas diffusion layer may include again a cathode fine pore layer and a cathode base material.

FIG. 8 schematically illustrates a generation principle of electricity of the fuel cell, and in the fuel cell, the most basic unit generating electricity is a membrane electrode assembly MEA which is constituted by an electrolyte membrane M, and an anode electrode A and a cathode electrode C formed on both surfaces of the electrolyte membrane M. Referring to FIG. 8 illustrating the generation principle of electricity of the fuel cell, in the anode electrode A, an oxidation reaction of fuel F such as hydrogen, methanol, or hydrocarbons such as butane occurs, and thus hydrogen ions ($H^+$) and electrons ($e^-$) are generated, and the hydrogen ions move through the electrolyte membrane M to the cathode electrode C. In the cathode electrode C, the hydrogen ions transferred through the electrolyte membrane M, the oxidizing agent O such as oxygen, and the electrons are reacted to generate water W. The electrons move to an external circuit by this reaction.

As described above, the membrane-electrode assembly MEA means an assembly of an electrode (the cathode and the anode) where an electrochemical catalyst reaction of fuel and air occurs and a polymer membrane where transferring of the hydrogen ions occurs, and is a single integral unit where the electrode (the cathode and the anode) and the electrolyte membrane adhere.

FIG. 9 schematically illustrates a structure of a membrane electrode assembly for a fuel cell, and the membrane electrode assembly for the fuel cell is provided with an electrolyte membrane 10 and the anode and the cathode positioned to face each other while the electrolyte membrane 10 is interposed therebetween.

The anode is constituted by an anode catalyst layer 20 and an anode gas diffusion layer 50, and the anode gas diffusion layer 50 is constituted again by an anode fine pore layer 30 and an anode base material 40. Herein, the anode gas diffusion layer is provided between the anode catalyst layer and the electrolyte membrane.

The cathode is constituted by a cathode catalyst layer 21 and a cathode gas diffusion layer 51, and the cathode gas diffusion layer 51 is constituted again by a cathode fine pore layer 31 and a cathode base material 41. Herein, the cathode gas diffusion layer is provided between the cathode catalyst layer and the electrolyte membrane.

FIG. 9 illustrates the anode and the cathode divided into the catalyst layers and the gas diffusion layers, but the present application is not limited thereto and structures of the anode and the cathode may be changed if necessary.

At least one of the catalyst layer of the anode and the catalyst layer of the cathode may include the carrier-metal nanoparticle complex as a catalyst. As the residue, the catalyst selected from the group consisting of platinum, ruthenium, osmium, a platinum-ruthenium alloy, a platinum-osmium alloy, a platinum-palladium alloy, and a platinum-transition metal alloy may be preferably used. The aforementioned catalysts itself may be used, and may be used while being carried in a carbon-based carrier.

In the case where the carrier-metal nanoparticle complex is used as the catalyst, since the metal nanoparticle has a wide surface area by the cavity, a reaction area is increased, and thus an effect of increasing catalyst activity may be secured, and moreover, performance of the fuel cell may be increased.

A process of introducing the catalyst layer may be performed by a general method known in the art, and for example, a catalyst ink may be directly applied on the electrolyte membrane or applied on the gas diffusion layer to form the catalyst layer. In this case, a coating method of the catalyst ink is not particularly limited, but spray coating, tape casting, screen printing, blade coating, die coating, or spin coating methods or the like may be used. The catalyst ink may be representatively formed of a catalyst, a polymer ionomer, and a solvent.

The gas diffusion layer servers as a movement passage of a reaction gas and water together with a role as a current conductor, and has a porous structure. Therefore, the gas diffusion layer may include a conductive base material. As the conductive base material, a carbon paper, a carbon cloth, or a carbon felt may be preferably used. The gas diffusion layer may further include a fine pore layer between the catalyst layer and the conductive base material. The fine pore layer may be used to improve performance of the fuel cell under a low humidification condition, and serves to reduce an amount of water emitted to the outside of the gas diffusion layer and thus allow the electrolyte membrane to be in a sufficient moistening state.

Specifically, the present application provides a polymer electrolyte-type fuel cell including a stack including one or two or more membrane-electrode assemblies and a bipolar plate interposed between the membrane-electrode assemblies; a fuel supply portion supplying fuel to the stack; and an oxidizing agent supply portion supplying an oxidizing agent to the stack.

The fuel cell according to the exemplary embodiment of the present application includes the stack, the fuel supply portion, and the oxidizing agent supply portion.

FIG. 10 schematically illustrates a structure of the fuel cell, and the fuel cell includes a stack 60, an oxidizing agent supply portion 70, and a fuel supply portion 80.

The stack 60 includes one or two or more membrane electrode assemblies described in the above, and in the case where two or more membrane electrode assemblies are included, the stack 60 includes a separator interposed therebetween. The separator serves to prevent the membrane electrode assemblies from being electrically connected and transfer fuel and the oxidizing agent supplied from the outside to the membrane electrode assembly.

The oxidizing agent supply portion 70 serves to supply the oxidizing agent to the stack 60. As the oxidizing agent, oxygen is representatively used, and oxygen or air may be injected by a pump 70 to be used.

The fuel supply portion 80 serves to supply fuel to the stack 60, and may be constituted by a fuel tank 81 storing fuel, and a pump 82 supplying fuel stored in the fuel tank 81 to the stack 60. As fuel, hydrogen or hydrocarbon fuel in a gas or liquid state may be used. Examples of hydrocarbon fuel may include methanol, ethanol, propanol, butanol, or a natural gas.

As the fuel cell, a polymer electrolyte fuel cell, a direct liquid fuel cell, a direct methanol fuel cell, a direct formic acid fuel cell, a direct ethanol fuel cell, a direct dimethylether fuel cell, or the like is feasible.

One exemplary embodiment of the present application provides a carrier-metal nanoparticle complex where a metal nanoparticle including a first metal and a second metal, and one or more cavities continuing from an external surface is carried in a carrier.

In one exemplary embodiment of the present application, the cavity may mean an empty space continuing from one region of the external surface of the metal nanoparticle. The cavity may be formed in a form of one tunnel from one or two or more regions of the external surface of the metal nanoparticle to one region of the inside of the metal nanoparticle. Further, the cavity may be formed in a form of a tunnel passing through the metal nanoparticle from one or two or more regions of the external surface of the metal nanoparticle. The form of the tunnel may be a straight line, a continuous form of a curved line or a straight line, and a continuous form where a curved line and a straight line are mixed.

FIG. 7 schematically illustrates a structure of the carrier-metal nanoparticle complex according to one exemplary embodiment of the present application. Referring to FIG. 7, a metal nanoparticle 2 is carried in a carrier 1. The metal nanoparticle 2 has three cavities. In FIG. 7, three cavities are illustrated, but the number of cavities may be one or more. Further, in FIG. 7, a structure formed in a form of one tunnel from one region of the external surface of the metal nanoparticle to one region of the inside is illustrated, but another structure such as a form of a tunnel passing through the metal nanoparticle may be formed.

The cavity may serve to utilize an internal surface area of the metal nanoparticle. Specifically, in the case where the metal nanoparticle is used for the purpose of the catalyst, the cavity may serve to increase a surface area that may come into contact with a reaction material. Therefore, the cavity may serve to exhibit high activity of the metal nanoparticle.

Specifically, the metal nanoparticle of the present application may include the cavity to increase the surface area by 20% to 50% as compared to the metal nanoparticle in the case where there is no cavity.

In one exemplary embodiment of the present application, a diameter of the cavity may be 5% or more and 30% or less, specifically 5% to 20%, and more specifically 5% to 15% of the particle diameter of the metal nanoparticle.

In the case where the diameter of the cavity is less than 5% of the particle diameter of the metal nanoparticle, activity of the metal nanoparticle may not be sufficiently exhibited. Further, in the case where the diameter of the cavity is more than 30% of the particle diameter of the metal nanoparticle, the shape of the metal nanoparticle may not be maintained. Therefore, there may be a merit in that in the case where the diameter of the cavity is 5% or more and 30% or less, specifically 5% to 20%, and more specifically 5% to 15% or less of the particle diameter of the metal nanoparticle, a contact area with the reaction material through the cavity may be sufficiently increased.

In one exemplary embodiment of the present application, one or more of the aforementioned cavities may pass through the metal nanoparticle.

Further, in one exemplary embodiment of the present application, the cavity may continue to one region of the inside of the metal nanoparticle.

Further, in one exemplary embodiment of the present application, the cavity may be a cylinder type. Alternatively, the cavity may be a bowl type.

In the present specification, the cylinder type does not necessarily mean a perfect cylinder, but means an appropriately cylinder shape.

In the present specification, the bowl type may have a hemisphere shape or a gourd bottle shape.

The diameter of the cylindrical cavity may be constantly maintained. Specifically, the cylindrical cavity of the present application may have a diameter difference of about 10% and may be continuously formed.

In one exemplary embodiment of the present application, a particle diameter of the metal nanoparticle may be 1 nm or more and 30 nm or less, and more specifically 20 nm or less, 12 nm or less, or 10 nm or less. Alternatively, an average particle diameter of the metal nanoparticles may be 6 nm or less. There is a big merit in that in the case where the particle diameter of the metal nanoparticle is 30 nm or less, the nanoparticles may be used in various fields. Further, it is more preferable that the particle diameter of the metal nanoparticle be 20 nm or less. Further, there is a merit in that in the case where the particle diameter of the metal nanoparticle is 10 nm or less, since a surface area of the particle is further increased, a possibility of application to various fields is further increased. For example, if the metal nanoparticle formed in the aforementioned particle diameter range is used as the catalyst, efficiency thereof may be significantly increased.

In the present specification, the particle diameter of the metal nanoparticle means the biggest value of diameters of cross-sections of the metal nanoparticles.

In one exemplary embodiment of the present application, the average particle diameter of the metal nanoparticles means a value obtained by measuring an average particle diameter through a statistical distribution obtained by measuring 200 or more metal nanoparticles by using a graphic software (MAC-View).

In one exemplary embodiment of the present application, the average particle diameter of the metal nanoparticles may be 1 nm or more and 30 nm or less, 1 nm or more and 20 nm or less, 1 nm or more and 12 nm or less, 1 nm or more and 10 nm or less, and 1 nm or more and 6 nm or less.

In one exemplary embodiment of the present application, when the metal nanoparticle is manufactured, one or more metal nanoparticles may be manufactured. In this case, in one exemplary embodiment of the present application, the particle diameter of the metal nanoparticle may be in the range of 80% to 120% of the average particle diameter of the metal nanoparticles. Specifically, the particle diameter of the metal nanoparticle may be in the range of 90% to 110% of the average particle diameter of the metal nanoparticles. In the case where the particle diameter deviates from the aforementioned range, since sizes of the metal nanoparticles become nonuniform overall, it may be difficult to secure intrinsic physical properties required by the metal nanoparticles. For example, in the case where the metal nanoparticles having the particle diameter deviating from the range of 80% to 120% of the average particle diameter of the metal nanoparticles are used as the catalyst, an efficiency improvement effect thereof may slightly become unsatisfactory. Therefore, in the case where the particle diameter is in the range of 80% to 120% of the average particle diameter of the metal nanoparticles of the specification of the present application, the nanoparticles having the uniform size may be formed to exhibit excellent physical properties as the nanoparticle.

In the case where two or more metal nanoparticles according to the present specification are manufactured, the content of the metal nanoparticles including one or more cavities continuing from the external surface of the specification of the present application may be 50% or more and 100% or less of that of the entire nanoparticles. Specifically, the content of the metal nanoparticles including one or more cavities continuing from the external surface may be 70% or more and 100% or less of that of the entire nanoparticles.

In one exemplary embodiment of the present application, the metal nanoparticle may include one cavity. That is, the metal nanoparticle may include only one cavity, or a plurality of cavities. The plural number means two or more.

In one exemplary embodiment of the present application, the metal nanoparticle may have a sphere shape.

In the present specification, the sphere shape does not mean only a perfect sphere shape, but may include an approximately sphere shape. For example, in the metal nanoparticle, an external surface of the sphere shape may not be flat, and in one metal nanoparticle, the radius of curvature may not be constant.

A mimetic diagram of the metal nanoparticle according to one exemplary embodiment of the present application is illustrated in FIG. 1. The carrier-metal nanoparticle complex where the metal nanoparticle is carried in the carrier is illustrated in FIGS. 2 to 5.

In one exemplary embodiment of the present application, the metal nanoparticle may include an alloy of the first metal and the second metal. Specifically, in the metal nanoparticle, a region other than the cavity may be formed of the alloy of the first metal and the second metal.

In one exemplary embodiment of the present application, in the metal nanoparticle, the first metal and the second metal may be uniformly mixed.

In one exemplary embodiment of the present application, the first metal may be selected from the group consisting of a metal, a metalloid, a lanthanum metal, and an actinium metal belonging to Group III to XV on a periodic table. Specifically, the first metal may be selected from the group consisting of platinum (Pt); ruthenium (Ru); rhodium (Rh); molybdenum (Mo); osmium (Os); iridium (Ir); rhenium (Re); palladium (Pd); vanadium (V); tungsten (W); cobalt (Co); iron (Fe); selenium (Se); nickel (Ni); bismuth (Bi); tin (Sn); chromium (Cr); titanium (Ti); gold (Au); cerium (Ce); silver (Ag); and copper (Cu).

In one exemplary embodiment of the present application, the second metal may be different from the first metal.

In one exemplary embodiment of the present application, the second metal may be selected from the group consisting of a metal, a metalloid, a lanthanum metal, and an actinium metal belonging to Group III to XV on a periodic table. Specifically, the second metal may be selected from the group consisting of platinum (Pt); ruthenium (Ru); rhodium (Rh); molybdenum (Mo); osmium (Os); iridium (Ir); rhenium (Re); palladium (Pd); vanadium (V); tungsten (W); cobalt (Co); iron (Fe); selenium (Se); nickel (Ni); bismuth (Bi); tin (Sn); chromium (Cr); titanium (Ti); gold (Au); cerium (Ce); silver (Ag); and copper (Cu).

As specific examples, in one exemplary embodiment of the present application, the first metal may be selected from the group consisting of platinum (Pt), silver (Ag), palladium (Pd), and gold (Au), and more specifically may be platinum (Pt). In this case, the second metal may be selected from the group consisting of ruthenium (Ru), rhodium (Rh), molybdenum (Mo), osmium (Os), iridium (Ir), rhenium (Re), palladium (Pd), vanadium (V), tungsten (W), cobalt (Co), iron (Fe), selenium (Se), nickel (Ni), bismuth (Bi), tin (Sn), chromium (Cr), titanium (Ti), cerium (Ce), silver (Ag), and copper (Cu), and more specifically may be nickel (Ni).

As other specific examples, in one exemplary embodiment of the present application, the first metal may be selected from the group consisting of ruthenium (Ru), rhodium (Rh), molybdenum (Mo), osmium (Os), iridium (Ir), rhenium (Re), palladium (Pd), vanadium (V), tungsten (W), cobalt (Co), iron (Fe), selenium (Se), nickel (Ni), bismuth (Bi), tin (Sn), chromium (Cr), titanium (Ti), cerium (Ce), silver (Ag), and copper (Cu), and more specifically may be nickel (Ni). In this case, the second metal may be selected from the group consisting of platinum (Pt), silver (Ag), palladium (Pd), and gold (Au), and more specifically may be platinum (Pt).

In one exemplary embodiment of the present application, the first metal or the second metal may be different from each other, and the first metal or the second metal may be nickel.

In one exemplary embodiment of the present application, the first metal or the second metal may be different from each other, and the first metal or the second metal may be platinum.

In one exemplary embodiment of the present application, the first metal may be nickel, and the second metal may be platinum.

In one exemplary embodiment of the present application, the carrier may be a carbon-based material or an inorganic minute particle.

The carbon carrier may be selected from the group consisting of a carbon nanotube (CNT), a graphite, a graphene, an activated carbon, a porous carbon, a carbon black, a carbon nanofiber, a carbon nanowire, a carbon nanohorn, a carbon aerogel, a carbon nanoring, fullerene (C60), and Super P.

Examples of the carbon black include a DENCA black, a KETJEN black, an acetylene black, or the like.

The carbon nanotube may include one of SWCNT, DWCNT, MWCNT, functionalized SWCNT, functionalized DWCNT, functionalized MWCNT, purified SWCNT, purified DWCNT, or purified MWCNT, or a mixture thereof. The carbon nanotube has a tube shape where a graphene sheet is rolled without a joint. The carbon nanotube where the number of the tubes is one is called a single walled carbon nanotube (SWCNT), the carbon nanotube where two tubes are rolled is called a double-walled carbon nanotube (DWCNT), and the carbon nanotube where two or more tubes are rolled is called a multi-walled carbon nanotube (MWCNT).

The inorganic minute particle may be selected from the group consisting of alumina, silica, titania, and zirconia.

In the carrier-metal nanoparticle complex manufactured according to one exemplary embodiment of the present application, a carrying ratio of the metal nanoparticle to the carrier may be 10 wt % to 70 wt %.

Further, the present application provides a method of manufacturing a fuel cell, including: preparing an electrolyte membrane; forming a cathode on one surface of the electrolyte membrane; and forming an anode on the other surface of the electrolyte membrane, in which at least one of the cathode and the anode includes a carrier-metal nanoparticle complex where a metal nanoparticle including a first metal and a second metal, and one or more cavities continuing from an external surface is carried in a carrier.

The cathode, the anode, and the carrier-metal nanoparticle complex are the same as those described in the above.

According to one exemplary embodiment of the present application, at least one of the forming of the cathode and the forming of the anode may further include manufacturing the carrier-metal nanoparticle complex, and the manufacturing of the carrier-metal nanoparticle complex may include forming a solution including a solvent, a first metal salt providing a first metal ion or an atomic group ion including the first metal ion in the solvent, a second metal salt providing a second metal ion or an atomic group ion including the second metal ion in the solvent, a first surfactant forming a micelle in the solvent, and a second surfactant forming the micelle together with the first surfactant in the solvent; adding the carrier to the solution to perform agitation; and adding a reducing agent to the solution to form the metal nanoparticle on the carrier.

One exemplary embodiment of the present application provides a method of manufacturing a carrier-metal nanoparticle complex, continuing the method including: forming a solution including a solvent, a first metal salt providing a first metal ion or an atomic group ion including the first metal ion in the solvent, a second metal salt providing a second metal ion or an atomic group ion including the second metal ion in the solvent, a first surfactant forming a micelle in the solvent, and a second surfactant forming the micelle together with the first surfactant in the solvent; adding the carrier to the solution to perform agitation; and adding a reducing agent to the solution to form the metal nanoparticle on the carrier in which the metal nanoparticle includes a first metal and a second metal and one or more cavities continuing from an external surface and is carried in a carrier. Hereinafter, the method of manufacturing the carrier-metal nanoparticle complex will be described in more detail.

According to the manufacturing method, the carrier-metal nanoparticle complex where the metal nanoparticles having the uniform size of several nanometers are effectively carried in the carrier may be manufactured. By a method in the related art, it is difficult to manufacture the metal nanoparticle having the size of several nanometers, it is more difficult to manufacture the metal nanoparticle having the uniform size, and the carrying ratio and dispersivity are poor. However, according to the manufacturing method of the present application, there are merits in that since the metal nanoparticle having the uniform size of several nanometers may be manufactured on the carrier by a simple method, a separate process of carrying the metal nanoparticle in the carrier is not required and the carrying ratio and dispersivity may be improved.

The method of manufacturing the carrier-metal nanoparticle complex has a merit in that since a reduction potential difference is not used, a reduction potential between the first metal ion and the second metal ion is not considered. Since the manufacturing method uses a charge between the metal ions, the manufacturing method is simple as compared to a manufacturing method using a reduction potential difference in the related art, and thus mass production is easy, and the metal nanoparticle complex carried in the carrier may be manufactured at low costs. Moreover, there is a merit in that since the reduction potential difference is not used, as compared to the method of manufacturing the metal nanoparticle in the related art, a limit to a used metal salt is reduced, and thus various metal salts may be used.

In one exemplary embodiment of the present application, the forming of the solution may include forming the micelle on the solution by the first and second surfactants.

In one exemplary embodiment of the present application, in the manufacturing method, the metal nanoparticle may be formed by the first metal ion or the atomic group ion including the first metal ion; and the second metal ion or the atomic group ion including the second metal ion.

In one exemplary embodiment of the present application, the first metal ion or the atomic group ion including the first metal ion may have a charge that is opposite to a charge of an external end of the first surfactant, and the second metal ion or the atomic group ion including the second metal ion may have a charge that is the same as the charge of the external end of the first surfactant.

Therefore, the first metal ion or the atomic group ion including the first metal ion may be positioned in the external end of the first surfactant forming the micelle in the solution to form a shape surrounding an external surface of the micelle. Moreover, the second metal ion or the atomic group ion including the second metal ion may form a shape surrounding an external surface of the first metal ion or the atomic group ion including the first metal ion. The first metal salt and the second metal salt may form the metal nanoparticles each including the first metal and the second metal by a reducing agent.

In the present specification, the external end of the surfactant may mean an external portion of the micelle of the first or second surfactant forming the micelle. The external end of the surfactant of the present application may mean a head of the surfactant. Further, the external end of the present application may determine the charge of the surfactant.

Further, the surfactant of the present application may be classified into an ionic type or a nonionic type according to a kind of the external end, and the ionic type may be a positive type, a negative type, a zwitterionic type, or an amphoteric type. The zwitterionic surfactant contains both positive and negative charges. If the positive and negative charges of the surfactant of the present application depend on a pH, the surfactant may be an amphoteric surfactant and may be zwitterionic in a predetermined pH range. Specifically, in the present specification, an anionic surfactant may mean that the external end of the surfactant has the negative charge, and a cationic surfactant may mean that the external end of the surfactant has the positive charge.

In one exemplary embodiment of the present application, in the metal nanoparticle carried in the carrier manufactured by the manufacturing method, the cavity may be formed in one or two or more regions.

In the present specification, the cavity may mean an empty space continuing from one region of the external surface of the metal nanoparticle. The cavity may be formed in a form of one tunnel from one region of the external surface. The form of the tunnel may be a straight line, a continuous form of a curved line or a straight line, and a continuous form where a curved line and a straight line are mixed.

Further, in one exemplary embodiment of the present application, the cavity may be a predetermined empty space continuing from the external surface of the metal nanoparticle to a region of the inside or outside of the metal nanoparticle. Specifically, the cavity may be an empty space ranging from one region of the metal nanoparticle to one region of the inside of the metal nanoparticle, and may be an empty space ranging from one region of the metal nanoparticle to another region of the metal nanoparticle.

The cavity may serve to utilize an internal surface area of the metal nanoparticle. Specifically, in the case where the metal nanoparticle is used for the purpose of the catalyst, the cavity may serve to increase a surface area that may come into contact with a reaction material. Therefore, the cavity may serve to exhibit high activity of the metal nanoparticle.

Further, in one exemplary embodiment of the present application, the metal nanoparticle carried in the carrier manufactured by the manufacturing method may be a metal nanoparticle including one or two or more cavities without an internal hollow.

In one exemplary embodiment of the present application, in the manufacturing method, a concentration; a chain length; an external end size; or a charge kind of the second surfactant may be adjusted to form the cavity in one or two or more regions of the metal nanoparticle.

In one exemplary embodiment of the present application, the first surfactant may serve to form the micelle in the solution to allow the metal ion or the atomic group ion including the metal ion to form a shell portion forming a basic shape of the metal nanoparticle or a metal nanoparticle shape, and the second surfactant may serve to form the cavity of the metal nanoparticle carried in the carrier.

In one exemplary embodiment of the present application, the forming of the solution may include adjusting the size or the number of the cavity by changing concentrations of the first and second surfactants. Specifically, the mole concentration of the second surfactant may be 0.01 to 0.05 times of the mole concentration of the first surfactant. That is, the mole concentration of the second surfactant may be 1/100 to 1/20 times of the mole concentration of the first surfactant. Specifically, the mole concentration of the second surfactant may be 1/30 to 1/10 of the mole concentration of the first surfactant.

In one exemplary embodiment of the present application, in the forming of the solution, the first surfactant and the second surfactant may form the micelle according to the aforementioned concentration ratio.

The size or the number of the cavity of the metal nanoparticle carried in the carrier may be adjusted by adjusting the mole concentration ratio of the first and second surfactants. Moreover, the carrier-metal nanoparticle complex where the metal nanoparticles including one or more bowl-type particles are carried in the carrier may be manufactured by continuously forming the cavities.

Further, in one exemplary embodiment of the present application, the forming of the solution may include adjusting the size of the external end of the second surfactant to adjust the size of the cavity.

Further, in one exemplary embodiment of the present application, the forming of the solution may include adjusting the chain length of the second surfactant to be different from the chain length of the first surfactant and thus forming the cavity in a second surfactant region.

According to one exemplary embodiment of the present application, the chain length of the second surfactant may be 0.5 to 2 times of the chain length of the first surfactant. Specifically, the chain length may be determined by the number of carbon atoms.

In one exemplary embodiment of the present application, the chain length of the second surfactant may be configured to be different from the chain length of the first surfactant to prevent the metal salt bonded to the external end of the second surfactant from forming the shell portion of the metal nanoparticle.

Further, in one exemplary embodiment of the present application, the forming of the solution may include adjusting the charge of the second surfactant to be different from the charge of the first surfactant to form the cavity.

In one exemplary embodiment of the present application, the first metal ion or the atomic group ion including the first metal ion having the charge that is opposite to the charge of the first and second surfactants may be positioned in the external end of the first and second surfactants forming the micelle in the solvent. Further, the second metal ion having the charge that is opposite to the charge of the first metal ion may be positioned in the external surface of the first metal ion.

In one exemplary embodiment of the present application, the first metal ion and the second metal ion formed in the external end of the first surfactant may form the shell portion of the metal nanoparticle, and the first metal ion and the second metal ion positioned in the external end of the second surfactant may not form the shell but form the cavity.

According to one exemplary embodiment of the present application, in the case where the first surfactant is an anionic surfactant, in the forming of the solution, the first surfactant may form the micelle, and the micelle may be surrounded by the positive ion of the first metal ion or the atomic group ion including the first metal ion. Moreover, the atomic group ion including the second metal ion of the negative ion may surround the positive ion. Moreover, in the adding of the reducing agent to form the metal nanoparticle, the positive ion surrounding the micelle may form the first shell, and the negative ion surrounding the positive ion may form the second shell.

Further, according to one exemplary embodiment of the present application, in the case where the first surfactant is a cationic surfactant, in the forming of the solution, the first surfactant may form the micelle, and the micelle may be surrounded by the negative ion of the atomic group ion including the first metal ion. Moreover, the second metal ion of the positive ion or the atomic group ion including the second metal ion may surround the negative ion. Moreover, in the adding of the reducing agent to form the metal nanoparticle, the negative ion surrounding the micelle may form the first shell, and the positive ion surrounding the negative ion may form the second shell.

Further, in one exemplary embodiment of the present application, the forming of the metal nanoparticle may include filling first and second surfactant regions forming the micelle with a metal. Specifically, in the case where the chain length of the second surfactant is longer or shorter than the length of the first surfactant forming the micelle, the first metal salt and the second metal salt may be filled in the micelle.

In one exemplary embodiment of the present application, in the case where the metal is filled in the first and second surfactants, the metal nanoparticle including one or two or more cavities may be manufactured without the hollow.

In one exemplary embodiment of the present application, both the first surfactant and the second surfactant may be the cationic surfactant.

Alternatively, in one exemplary embodiment of the present application, both the first surfactant and the second surfactant may be the anionic surfactant.

In one exemplary embodiment of the present application, in the case where the first and second surfactants have the same charge, the chain length of the second surfactant may be configured to be different from the chain length of the first surfactant to form the micelle.

Specifically, due to a chain length difference of the second surfactant, the first and second metal ions positioned in the external end of the second surfactant are not adjacent to the first and second metal ions positioned in the external end of the first surfactant, and thus the shell portion is not formed.

In one exemplary embodiment of the present application, any one of the first surfactant and the second surfactant may be the anionic surfactant, and the other may be the cationic surfactant. That is, in one exemplary embodiment of the present application, the first and second surfactants may have different charges.

In one exemplary embodiment of the present application, in the case where the first and second surfactants have different charges, the chain lengths may be configured to be different from each other to form the cavity of the metal nanoparticle. In this case, a forming principle of the cavity is the same as that of the aforementioned case where the first and second surfactants have the same charge.

In one exemplary embodiment of the present application, in the case where the first and second surfactants have different charges, even though the chain lengths of the first and second surfactants are the same as each other, the cavity of the metal nanoparticle may be formed. In this case, the external end of the second surfactant of the micelle and the external end of the first surfactant adjacent thereto exchange the charges each other to be neutral, and thus the metal ion is not positioned at the external ends. Therefore, a portion where the metal ion is not positioned does not form the shell portion, and thus the cavity of the metal nanoparticle may be formed.

In one exemplary embodiment of the present application, the first surfactant may be the anionic surfactant or the cationic surfactant, and the second surfactant may be the nonionic surfactant.

In one exemplary embodiment of the present application, in the case where the second surfactant is the nonionic surfactant, since the metal ion is not positioned in the external end of the second surfactant, the cavity of the metal nanoparticle may be formed. Therefore, in the case where the second surfactant is nonionic, even though the chain length thereof is the same as or different from that of the first surfactant, the cavity of the metal nanoparticle may be formed.

In one exemplary embodiment of the present application, the first surfactant may be the anionic surfactant or the cationic surfactant, and the second surfactant may be the zwitterionic surfactant.

In one exemplary embodiment of the present application, in the case where the second surfactant is the zwitterionic surfactant, since the metal ion is not positioned in the external end of the second surfactant, the cavity of the metal nanoparticle may be formed. Therefore, even in the case where the second surfactant is zwitterionic, even though the chain length thereof is the same as or different from that of the first surfactant, the cavity of the metal nanoparticle may be formed.

The anionic surfactant may be selected from the group consisting of N-dodecyl-N,N-dimethyl-3-ammonio-1-propane sulfonate, sodium 1-heptane sulfonate, potassium laurate, triethanolamine stearate, ammonium lauryl sulfate, lithium dodecyl sulfate, sodium lauryl sulfate, sodium dodecyl sulfate, alkyl polyoxyethylene sulfate, sodium alginate, dioctyl sodium sulfosuccinate, phosphatidyl glycerol, phosphatidyl inositol, phosphatidylserine, phosphatidic acid and a salt thereof, glyceryl ester, sodium carboxymethylcellulose, bile acid and a salt thereof, cholic acid, deoxycholic acid, glycocholic acid, taurocholic acid, glycodeoxycholic acid, alkyl sulfonate, aryl sulfonate, alkyl phosphate, alkyl phosphonate, stearic acid and a salt thereof, calcium stearate, phosphate, carboxymethylcellulose sodium, dioctyl sulfosuccinate, dialkylester of sodium sulfosuccinic acid, phospholipid, and calcium carboxymethylcellulose. However, the anionic surfactant is not limited thereto.

The cationic surfactant may be selected from the group consisting of a quaternary ammonium compound, benzalkonium chloride, cetyltrimethylammonium bromide, chitosan, lauryldimethylbenzylammonium chloride, acyl carnitine hydrochloride, alkylpyridinium halide, cetyl pyridinium chloride, cationic lipid, polymethylmethacrylate trimethylammonium bromide, a sulfonium compound, polyvinylpyrrolidone-2-dimethylaminoethyl methacrylate dimethyl sulfate, hexadecyltrimethyl ammonium bromide, a phosphonium compound, benzyl-di(2-chloroethyl)ethylammonium bromide, coconut trimethyl ammonium chloride, coconut trimethyl ammonium bromide, coconut methyl dihydroxyethyl ammonium chloride, coconut methyl dihydroxyethyl ammonium bromide, decyl triethyl ammonium chloride, decyl dimethyl hydroxyethyl ammonium chloride bromide, ($C_{12}$-$C_{15}$)-dimethyl hydroxyethyl ammonium chloride, ($C_{12}$-$C_{15}$)-dimethyl hydroxyethyl ammonium chloride bromide, coconut dimethyl hydroxy ethyl ammonium chloride, coconut dimethyl hydroxyethyl ammonium bromide, myristyl trimethyl ammonium methylsulfate, lauryl dimethyl benzyl ammonium chloride, lauryl dimethyl benzyl ammonium bromide, lauryl dimethyl (ethenoxy)4 ammonium chloride, lauryl dimethyl (ethenoxy)4 ammonium bromide, N-alkyl($C_{12}$-$C_{18}$) dimethylbenzyl ammonium chloride, N-alkyl($C_{14}$-$C_{18}$) dimethyl-benzyl ammonium chloride, N-tetradecyldimethylbenzyl ammonium chloride monohydrate, dimethyl didecyl ammonium chloride, N-alkyl($C_{12}$-$C_{14}$) dimethyl 1-naphthylmethyl ammonium chloride, a trimethylammonium halide alkyl-trimethylammonium salt, a dialkyl-dimethylammonium salt, lauryl trimethyl ammonium chloride, an ethoxylated alkylamidoalkyldialkylammonium salt, an ethoxylated trialkyl ammonium salt, dialkylbenzene dialkylammonium chloride, N-didecyldimethyl ammonium chloride, N-tetradecyldimethylbenzyl ammonium chloride monohydrate, N-alkyl($C_{12}$-$C_{14}$) dimethyl 1-naphthylmethyl ammonium chloride, dodecyldimethylbenzyl ammonium chloride, dialkyl benzenealkyl ammonium chloride, lauryl trimethyl ammonium chloride, alkylbenzyl methyl ammonium chloride, alkyl benzyl dimethyl ammonium bromide, $C_{12}$ trimethylammonium bromide, $C_{15}$ trimethylammonium bromide, $C_{17}$ trimethylammonium bromide, dodecylbenzyltriethylammonium chloride, polydiallyldimethylammonium chloride, dimethylammonium chloride, alkyldimethylammonium halogenid, tricetylmethylammonium chloride, cetyltrimethylammonium bromide, decyltrimethylammonium bromide, dodecyltriethylammonium bromide, tetradecyltrimethylammonium bromide, methyl trioctylammonium chloride, POLYQUAT 10, tetrabutylammonium bromide, benzyltrimethylammonium bromide, choline ester, benzalkonium chloride, stearalkonium chloride, cetyl pyridinium bromide, cetyl pyridinium chloride, a halide salt of quaternized polyoxyethylalkylamine, "MIRAPOL" (polyquaternium-2), "Alkaquat" (alkyldimethylbenzylammonium chloride, manufactured by Rhodia), an alkyl pyridinium salt, amine, an amine salt, an imide azolinium salt, a protonated quaternary acrylamide, a methylated quaternary polymer, a cationic guar gum, benzalkonium chloride, dodecyltrimethylammonium bromide, triethanol amine, and poloxamine. However, the cationic surfactant is not limited thereto.

The nonionic surfactant of the present application may be selected from the group consisting of polyoxyethylene fatty alcohol ether, polyoxyethylene sorbitan fatty acid ester, polyoxyethylene fatty acid ester, polyoxyethylene alkyl ether, a polyoxyethylene castor oil derivative, sorbitan ester, glyceryl ester, glycerol monostearate, polyethylene glycol, polypropylene glycol, polypropylene glycol ester, cetyl alcohol, cetostearyl alcohol, stearyl alcohol, arylalkyl polyether alcohol, a polyoxyethylenepolyoxypropylene copolymer, poloxamer, poloxamine, methyl cellulose, hydroxy cellulose, hydroxymethyl cellulose, hydroxyethyl cellulose, hydroxypropyl cellulose, hydroxypropylmethyl cellulose, hydroxypropylmethyl cellulose phthalate, amorphous cellulose, polysaccharides, starch, a starch derivative, hydroxyethyl starch, polyvinyl alcohol, triethanolamine stearate, amine oxide, dextran, glycerol, acacia gum, cholesterol, tragacanth, and polyvinylpyrrolidone.

The zwitterionic surfactant of the present application may be selected from the group consisting of betaine, alkyl betaine, alkylamido betaine, amidopropyl betaine, cocoamphocarboxy glycinate, sarcosinate aminopropionate, aminoglycinate, imidazolinium betaine, amphoteric imidazoline, N-alkyl-N,N-dimethylammonio-1-propane sulfonate, 3-cholamido-1-propyldimethylammonio-1-propane sulfonate, dodecylphosphocholine, and sulfo-betaine. However, the zwitterionic surfactant is not limited thereto.

In one exemplary embodiment of the present application, the concentration of the first surfactant may be one times or more and five times or less of a critical micelle concentration with respect to the solvent. Specifically, the concentration of the first surfactant may be two times of the critical micelle concentration with respect to the solvent.

In the present application, the critical micelle concentration (CMC) means a lower limit of a concentration at which the surfactant forms a group (micelle) of molecules or ions in the solution.

The most important characteristic of the surfactant is that the surfactant has an adsorption tendency on an interface, for example, an air-liquid interface, an air-solid interface, and a liquid-solid interface. In the case where the surfactants are free, which means that the surfactant does not exist in an agglomeration form, the surfactants are called monomers or unimers, and if a concentration of the unimers is increased, the unimers are agglomerated to form an entity of small agglomerates, that is, the micelle. This concentration may be called the critical micelle concentration.

If the concentration of the first surfactant is less than one time of the critical micelle concentration, the concentration of the first surfactant adsorbed on the first metal salt may be relatively reduced. Accordingly, an amount of the formed core particles may be reduced overall. Meanwhile, if the concentration of the first surfactant is more than 5 times of the critical micelle concentration, the concentration of the first surfactant is relatively increased, and thus the metal nanoparticles may be agglomerated. Therefore, in the case where the concentration of the first surfactant is one time or more and five times or less of the critical micelle concentration with respect to the solvent, the metal nanoparticle may be smoothly formed.

In one exemplary embodiment of the present application, the first surfactant forming the micelle and/or the first and second metal salts surrounding the micelle may be adjusted to adjust the size of the metal nanoparticle.

In one exemplary embodiment of the present application, the size of the metal nanoparticle may be adjusted by the chain length of the first surfactant forming the micelle. Specifically, if the chain length of the first surfactant is short, the size of the micelle is reduced, and thus the size of the metal nanoparticle may be reduced.

In one exemplary embodiment of the present application, the number of carbon atoms of the chain of the first surfactant may be 15 or less. Specifically, the number of carbon atoms of the chain may be 8 or more and 15 or less. Alternatively, the number of carbon atoms of the chain may be 10 or more and 12 or less.

In one exemplary embodiment of the present application, a kind of a counter ion of the first surfactant forming the micelle may be adjusted to adjust the size of the metal nanoparticle. Specifically, as the size of the counter ion of the first surfactant is increased, bonding force with a head portion of the external end of the first surfactant may be weakened to increase the size of the micelle, and thus the size of the metal nanoparticle may be increased.

In one exemplary embodiment of the present application, in the case where the first surfactant is the anionic surfactant, the first surfactant may include $NH_4^+$, $K^+$, $Na^+$, or $Li^+$ as the counter ion.

Specifically, in the order of the case where the counter ion of the first surfactant is $NH_4^+$, the case where the counter ion of the first surfactant is $K^+$, the case where the counter ion of the first surfactant is $Na^+$, and the case where the counter ion of the first surfactant is $Li^+$, the size of the metal nanoparticle may be reduced.

In one exemplary embodiment of the present application, in the case where the first surfactant is the cationic surfactant, the first surfactant may include $I^-$, $Br^-$, or $Cl^-$ as the counter ion.

Specifically, in the order of the case where the counter ion of the first surfactant is I⁻, the case where the counter ion of the first surfactant is Br⁻, and the case where the counter ion of the first surfactant is Cl⁻, the size of the metal nanoparticle may be reduced.

In one exemplary embodiment of the present application, the size of the head portion of the external end of the first surfactant forming the micelle may be adjusted to adjust the size of the metal nanoparticle. Moreover, in the case where the size of the head portion of the first surfactant formed on the external surface of the micelle is increased, repulsive force between the head portions of the first surfactant may be increased to increase the micelle, and thus the size of the metal nanoparticle may be increased.

In one exemplary embodiment of the present application, the size of the metal nanoparticle may be determined by complex action of the aforementioned technical elements.

According to one exemplary embodiment of the present application, the metal salt is not particularly limited as long as the metal salt is ionized on the solution to provide the metal ion. The metal salt may be ionized in a solution state to provide the positive ion including the metal ion or the negative ion of the atomic group ion including the metal ion. The first metal salt and the second metal salt may be different from each other. Specifically, the first metal salt may provide the positive ion including the metal ion, and the second metal salt may provide the negative ion of the atomic group ion including the metal ion. Specifically, the first metal salt may provide the positive ion of $Ni^{2+}$, and the second metal salt may provide the negative ion of $PtCl_4^{2-}$.

According to one exemplary embodiment of the present application, the first metal salt and the second metal salt are not particularly limited as long as the metal salt is ionized on the solution to provide the metal ion or the atomic group ion including the metal ion.

In one exemplary embodiment of the present application, the first metal salt and the second metal salt may be each independently a salt of one selected from the group consisting of a metal, a metalloid, a lanthanum metal, and an actinium metal belonging to Group III to XV on a periodic table.

Specifically, the first metal salt and the second metal salt are different from each other, and may be each independently a salt of a metal selected from the group consisting of platinum (Pt), ruthenium (Ru), rhodium (Rh), molybdenum (Mo), osmium (Os), iridium (Ir), rhenium (Re), palladium (Pd), vanadium (V), tungsten (W), cobalt (Co), iron (Fe), selenium (Se), nickel (Ni), bismuth (Bi), tin (Sn), chromium (Cr), titanium (Ti), gold (Au), cerium (Ce), silver (Ag), and copper (Cu).

More specifically, in one exemplary embodiment of the present application, the first metal salt may be a salt of a metal selected from the group consisting of ruthenium (Ru), rhodium (Rh), molybdenum (Mo), osmium (Os), iridium (Ir), rhenium (Re), palladium (Pd), vanadium (V), tungsten (W), cobalt (Co), iron (Fe), selenium (Se), nickel (Ni), bismuth (Bi), tin (Sn), chromium (Cr), titanium (Ti), cerium (Ce), silver (Ag), and copper (Cu), and even more specifically may be a salt of nickel (Ni).

More specifically, in one exemplary embodiment of the present application, the second metal salt may be a salt of a metal selected from the group consisting of platinum (Pt), ruthenium (Ru), rhodium (Rh), molybdenum (Mo), osmium (Os), iridium (Ir), rhenium (Re), palladium (Pd), vanadium (V), tungsten (W), cobalt (Co), iron (Fe), selenium (Se), nickel (Ni), bismuth (Bi), tin (Sn), chromium (Cr), titanium (Ti), gold (Au), cerium (Ce), silver (Ag), and copper (Cu).

More specifically, the second metal salt may be a salt of a metal consisting of platinum (Pt), palladium (Pd), and gold (Au), and even more specifically a salt of platinum (Pt).

According to one exemplary embodiment of the present application, the first metal salt and the second metal salt may be each independently nitrates, halides such as chlorides, bromides, and iodides, hydroxides, or sulfates of the metal. However, the first metal salt and the second metal salt are not limited thereto.

According to one exemplary embodiment of the present application, in the forming of the solution, a mole ratio of the first metal salt and the second metal salt may be 1:5 to 10:1. Specifically, the mole ratio of the first metal salt and the second metal salt may be 2:1 to 5:1.

In one exemplary embodiment of the present application, an atomic percentage ratio of the first metal and the second metal may be 1:5 to 10:1. The atomic percentage ratio may be, in the case where the metal nanoparticle is formed of an alloy of the first metal and the second metal, an atomic percentage ratio of the first metal and the second metal.

In one exemplary embodiment of the present application, the forming of the solution may further include adding a stabilizer.

Examples of the stabilizer may include one or a mixture of two or more selected from the group consisting of disodium phosphate, dipotassium phosphate, disodium citrate, and trisodium citrate.

According to one exemplary embodiment of the present application, the adding of the carrier to the solution to perform agitation may be performed for 5 minutes to 120 minutes, more specifically 10 minutes to 90 minutes, and even more specifically 20 minutes to 60 minutes.

The manufacturing method according to one exemplary embodiment of the present application has a merit in that before the metal nanoparticle is formed, since the first metal salt and the second metal salt are dispersed in the carrier, the metal salts are uniformly dispersed. Accordingly, when the metal nanoparticles are formed, the particles are less agglomerated. Further, there is a merit in that adhesion force or bonding force between the carrier and the metal nanoparticle is increased.

In the manufacturing method according to one exemplary embodiment of the present application, the carrier is the same as that described in the above.

According to one exemplary embodiment of the present application, the adding of the carrier to perform agitation may include dispersing the carrier in the solvent.

Specifically, if the carrier is dispersed in the solvent and then added to the solution, an entanglement phenomenon of the carrier and the particles may be reduced.

In one exemplary embodiment of the present application, the adding of the reducing agent to the solution to form the metal nanoparticle on the carrier may include further adding a nonionic surfactant together with the reducing agent.

The nonionic surfactant is adsorbed on the surface of the metal nanoparticle to uniformly disperse the metal nanoparticles formed on the carrier in the solution. Therefore, the nonionic surfactant may prevent the metal particles from being precipitated by wadding or agglomeration and form the metal nanoparticles having a uniform size. Specific examples of the nonionic surfactant are the same as the aforementioned examples of the nonionic surfactant.

In one exemplary embodiment of the present application, the solvent may be a solvent including water. Specifically, according to one exemplary embodiment of the present application, the solvent is a matter dissolving the first metal salt and the second metal salt, and may be water or a mixture of water and alcohol having 1 to 6 carbon atoms, and more specifically water. In the manufacturing method, in the case where water is used as the solvent, since an organic solvent is not used, in the manufacturing process, a post-treatment process of treating the organic solvent is not required, and thus there are a cost reduction effect and a prevention effect of environmental pollution.

In one exemplary embodiment of the present specification, the manufacturing method may be performed at room temperature. Specifically, the manufacturing method may be performed at a temperature in the range of 4° C. or more and 35° C. or less and more specifically 15° C. or more and 28° C. or less.

In one exemplary embodiment of the present application, the forming of the solution may be performed at room temperature, specifically a temperature in the range of 4° C. or more and 100° C. or less, more specifically 4° C. or more and 35° C. or less, and even more specifically 15° C. or more and 28° C. or less. There is a problem in that if the organic solvent is used as the solvent, manufacturing should be performed at a high temperature of more than 100° C. In the present application, since manufacturing may be performed at room temperature, the manufacturing method is simple, and thus there is a merit in terms of a process and a cost reduction effect is large.

According to one exemplary embodiment of the present application, the forming of the solution may be performed for 5 minutes to 120 minutes, more specifically 10 minutes to 90 minutes, and even more specifically 20 minutes to 60 minutes.

In one exemplary embodiment of the present application, the adding of the carrier to the solution to perform agitation and the adding of the reducing agent to the solution to form the metal nanoparticle on the carrier may be performed at room temperature, specifically a temperature in the range of 4° C. or more and 100° C. or less, more specifically 4° C. or more and 35° C. or less, and even more specifically 15° C. or more and 28° C. or less. There is a problem in that if the organic solvent is used as the solvent, manufacturing should be performed at a high temperature of more than 100° C. In the present application, since manufacturing may be performed at room temperature, the manufacturing method is simple, and thus there is a merit in terms of a process and a cost reduction effect is large.

In one exemplary embodiment of the present application, the adding of the carrier to the solution to perform agitation may be performed by agitation for 5 minutes to 120 minutes, more specifically 10 minutes to 90 minutes, and even more specifically 20 minutes to 60 minutes.

In one exemplary embodiment of the present application, the adding of the reducing agent to the solution to form the metal nanoparticle on the carrier may be performed by agitation for 5 minutes to 120 minutes, more specifically 10 minutes to 90 minutes, and even more specifically 20 minutes to 60 minutes.

A standard reduction potential of the reducing agent may be −0.23 V or less. The reducing agent is not particularly limited as long as the reducing agent is a strong reducing agent having standard reduction of −0.23 V or less and specifically −4 V or more and −0.23 V or less and has reducing power capable of reducing molten metal ions to precipitate the metal ions into metal particles. Specifically, the reducing agent may be at least one selected from the group consisting of $NaBH_4$, $NH_2NH_2$, $LiAlH_4$, and $LiBEt_3H$.

In the case where a weak reducing agent is used, since there is difficulty in performing a continuous process because of a slow reaction speed and requirement of subsequent heating of the solution, there may be a problem in mass production, and particularly, there is a problem in that in the case where ethylene glycol that is a kind of the weak reducing agent is used, productivity in a continuous process is low due to a reduction in flow speed by a high viscosity. Therefore, in the case where the reducing agent of the present application is used, the aforementioned problems may be overcome.

According to one exemplary embodiment of the present application, the manufacturing method may further include, after forming the metal nanoparticle including the cavity, removing the surfactant in the cavity. A removing method is not particularly limited, and for example, a washing method by water may be used. The surfactant may be the anionic surfactant and/or the cationic surfactant.

According to one exemplary embodiment of the present application, after the carrier-metal nanoparticle complex is formed, in order to precipitate the carrier-metal nanoparticle complex included in the solution, the solution may be subjected to centrifugation. After centrifugation, only the separated carrier-metal nanoparticle complex may be collected. If necessary, a firing process of the carrier-metal nanoparticle complex may be further performed.

According to one exemplary embodiment of the present application, the carrier-metal nanoparticle complex where the metal nanoparticles having the uniform size of several nanometers are carried in the carrier may be manufactured. It is difficult to manufacture the metal nanoparticle having the size of several nanometers carried in the carrier by a method in the related art, and it is more difficult to manufacture the metal nanoparticle having the uniform size.

MODE FOR DISCLOSURE

Hereinafter, the present specification will be specifically described in detail through Examples. However, the Examples according to the present specification may be modified in various other forms, and the scope of the present application is not interpreted to be limited to the Examples as will be described below in detail. The Examples of the present application are provided to more fully describe the present specification to a person with ordinary skill in the art.

In the following Examples, the first metal salt is the salt including the first metal ion that is the precursor of the first metal or the atomic group ion including the first metal ion, and may serve to provide the first metal. Further, the second metal salt is the salt including the second metal ion that is the precursor of the second metal or the atomic group ion including the second metal ion, and may serve to provide the second metal.

Preparation Example 1

$Ni(NO_3)_2$ as the first metal salt, $K_2PtCl_4$ as the second metal salt, ammonium lauryl sulfate (ALS) as the first surfactant, and N-dodecyl-N,N-dimethyl-3-ammonio-1-propane sulfonate (DDAPS) as the second surfactant were dissolved in water, and then agitated for 30 minutes to form the solution. The mole ratio of $Ni(NO_3)_2$ and $K_2PtCl_4$ was 3:1, the concentration of ALS was two times of the critical micelle concentration (CMC) with respect to water, and the concentration of DDAPS was 1/10 mole of that of ALS. Thereafter, the carbon dispersed in water was added to the solution to be agitated for 30 minutes, and NaBH$_4$ that was the reducing agent was then added, followed by the reaction for 30 minutes.

Thereafter, centrifugation was performed at 10,000 rpm for 10 minutes to remove the supernatant of the upper layer, the residual precipitate was re-dispersed in distilled water, and the centrifugation process was repeated to manufacture the carrier-metal nanoparticle complex.

FIGS. 2 and 3 illustrate a transmission electron microscope (TEM) image of a carrier-metal nanoparticle complex manufactured according to Preparation Example 1.

Preparation Example 2

Ni(NO$_3$)$_2$ as the first metal salt, K$_2$PtCl$_4$ as the second metal salt, ammonium lauryl sulfate (ALS) as the first surfactant, and dodecyltrimethylammonium bromide (DTAB) as the second surfactant were dissolved in water, and then agitated for 30 minutes to form the solution. The mole ratio of Ni(NO$_3$)$_2$ and K$_2$PtCl$_4$ was 3:1, the concentration of ALS was two times of the critical micelle concentration (CMC) with respect to water, and the concentration of DTAB was 1/5 mole of that of ALS. Thereafter, the carbon dispersed in water was added to the solution to be agitated for 30 minutes, and NaBH$_4$ that was the reducing agent was then added, followed by the reaction for 30 minutes.

Thereafter, centrifugation was performed at 10,000 rpm for 10 minutes to remove the supernatant of the upper layer, the residual precipitate was re-dispersed in distilled water, and the centrifugation process was repeated to manufacture the carrier-metal nanoparticle complex.

FIGS. 4 and 5 illustrate a transmission electron microscope (TEM) image of a carrier-metal nanoparticle complex manufactured according to Preparation Example 2. Reviewing FIG. 5, it can be confirmed that the diameter of the metal nanoparticle formed on the carrier is 16.5 nm, 12.2 nm, 14.0 nm, 13.0 nm, 9.24 nm, 14.4 nm, 13.4 nm, 11.0 nm, and 13.2 nm from the left of the drawing.

As illustrated in FIGS. 2 to 5, it can be confirmed that in the metal nanoparticle of the carrier-metal nanoparticle complex according to the present application, the cavity is formed on the carrier. On the other hand, FIG. 9 is the transmission electron microscope (TEM) image of the carrier-metal nanoparticle complex in the related art, and it can be confirmed that the metal nanoparticle has the sphere shape of the solid where the cavity is not formed.

Although the exemplary embodiments of the present application are described with reference to the accompanying drawings, the present application is not limited to the exemplary embodiments but may be manufactured in various different forms, and it will be appreciated by those skilled in the art that various modifications and changes may be made thereto without departing from the technical spirit or essential feature of the application. Therefore, it should be understood that the above exemplary embodiments are illustrative in all aspects but are not limitative.

EXPLANATION OF REFERENCE NUMERALS AND SYMBOLS

1: Carrier
2: Metal nanoparticle
3, 4: Cavity
10: Electrolyte membrane
20, 21: Catalyst layer
30, 31: Fine pore layer
40, 41: Electrode base material
50, 51: Gas diffusion layer
60: Stack
70: Oxidizing agent supply portion
80: Fuel supply portion
81: Fuel tank
82: Pump

The invention claimed is:

1. A fuel cell comprising:
a cathode;
an anode; and
an electrolyte membrane provided between the cathode and the anode,
wherein at least one of the cathode and the anode includes a carrier-metal nanoparticle complex where a metal nanoparticle is carried in a carrier, the metal nanoparticle including a first metal, a second metal, and one or more cavities, wherein the one or more cavities extend from an external surface of the metal nanoparticle to an internal region of the metal nanoparticle,
wherein the carrier-metal nanoparticle complex is manufactured by a method including:
forming a solution including a solvent, a first metal salt providing a first metal ion or an atomic group ion including the first metal ion in the solvent, a second metal salt providing a second metal ion or an atomic group ion including the second metal ion in the solvent, a first surfactant forming a micelle in the solvent, and a second surfactant forming the micelle together with the first surfactant in the solvent;
adding a carrier to the solution to perform agitation; and
adding a reducing agent to the solution to form the metal nanoparticle on the carrier.

2. The fuel cell of claim 1, wherein at least one of the one or more cavities passes through the metal nanoparticle.

3. The fuel cell of claim 1, wherein the one or more cavities have a cylindrical shape or a bowl shape.

4. The fuel cell of claim 1, wherein a particle diameter of the metal nanoparticle is 1 nm or more and 30 nm or less.

5. The fuel cell of claim 1, wherein a particle diameter of the metal nanoparticle is 1 nm or more and 20 nm or less.

6. The fuel cell of claim 1, wherein a particle diameter of the metal nanoparticle is 1 nm or more and 12 nm or less.

7. The fuel cell of claim 1, wherein a particle diameter of the metal nanoparticle is 1 nm or more and 6 nm or less.

8. The fuel cell of claim 1, wherein a diameter of the one or more cavities is 5% or more and 30% or less of a particle diameter of the metal nanoparticle.

9. The fuel cell of claim 1, wherein a particle diameter of the metal nanoparticle is in a range of 80% to 120% of an average particle diameter of the metal nanoparticles.

10. The fuel cell of claim 1, wherein the metal nanoparticle has a sphere shape.

11. The fuel cell of claim 1, wherein the metal nanoparticle includes an alloy of the first metal and the second metal.

12. The fuel cell of claim 1, wherein an atomic percentage ratio of the first metal and the second metal is 1:5 to 10:1.

13. The fuel cell of claim 1, wherein the first metal and the second metal are each independently at least one selected from the group consisting of a metal, a metalloid, a lanthanum metal, and an actinium metal belonging to Group III to XV on a periodic table.

14. The fuel cell of claim 1, wherein the first metal and the second metal are each independently at least one selected from the group consisting of platinum (Pt); ruthenium (Ru); rhodium (Rh); molybdenum (Mo); osmium (Os); iridium (Ir); rhenium (Re); palladium (Pd); vanadium (V); tungsten (W); cobalt (Co); iron (Fe); selenium (Se); nickel (Ni); bismuth (Bi); tin (Sn); chromium (Cr); titanium (Ti); gold (Au); cerium (Ce); silver (Ag); and copper (Cu).

15. The fuel cell of claim 1, wherein the carrier is a carbon-based material.

16. The fuel cell of claim 1, wherein a carrying ratio of the metal nanoparticle to the carrier is 10 wt % to 70 wt %.

17. The fuel cell of claim 1, wherein the first metal or the second metal are different from each other, and the first metal or the second metal is nickel.

18. The fuel cell of claim 1, wherein the first metal or the second metal are different from each other, and the first metal or the second metal is platinum.

19. The fuel cell of claim 1, wherein the first metal is nickel and the second metal is platinum.

20. A method of manufacturing a fuel cell, comprising:
   preparing an electrolyte membrane;
   forming a cathode on one surface of the electrolyte membrane; and
   forming an anode on the other surface of the electrolyte membrane,
   wherein at least one of the cathode and the anode includes a carrier-metal nanoparticle complex where a metal nanoparticle is carried in a carrier, the metal nanoparticle including a first metal, a second metal, and one or more cavities, wherein the one or more cavities extend from an external surface of the metal nanoparticle to an internal region of the metal nanoparticle, wherein at least one of the forming of the cathode and the forming of the anode further includes manufacturing the carrier-metal nanoparticle complex, and the manufacturing of the carrier-metal nanoparticle complex includes:
   forming a solution including a solvent, a first metal salt providing a first metal ion or an atomic group ion including the first metal ion in the solvent, a second metal salt providing a second metal ion or an atomic group ion including the second metal ion in the solvent, a first surfactant forming a micelle in the solvent, and a second surfactant forming the micelle together with the first surfactant in the solvent;
   adding a carrier to the solution to perform agitation; and
   adding a reducing agent to the solution to form the metal nanoparticle on the carrier.

* * * * *